US011785473B2

(12) United States Patent
Gundu Rao

(10) Patent No.: US 11,785,473 B2
(45) Date of Patent: *Oct. 10, 2023

(54) COEXISTENCE OPERATION OF WIRELESS DEVICES

(71) Applicant: Cypress Semiconductor Corporation, San Jose, CA (US)

(72) Inventor: Rajendra Kumar Gundu Rao, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/502,618

(22) Filed: Oct. 15, 2021

(65) Prior Publication Data

US 2022/0182845 A1 Jun. 9, 2022

Related U.S. Application Data

(63) Continuation of application No. 16/445,002, filed on Jun. 18, 2019, now Pat. No. 11,159,948.

(51) Int. Cl.
*H04W 16/14* (2009.01)
*H04W 72/23* (2023.01)
*H04W 74/00* (2009.01)
*H04W 74/08* (2009.01)
*H04W 84/12* (2009.01)
*H04W 74/06* (2009.01)

(52) U.S. Cl.
CPC .......... *H04W 16/14* (2013.01); *H04W 72/23* (2023.01); *H04W 74/006* (2013.01); *H04W 74/0808* (2013.01); *H04W 84/12* (2013.01)

(58) Field of Classification Search
None
See application file for complete search history.

*Primary Examiner* — Faruk Hamza
*Assistant Examiner* — Cassandra L Decker

(57) ABSTRACT

An apparatus is provided. The apparatus comprises a controller configured to operate in an access point (AP) mode. The apparatus also includes a processing device. The processing device is configured to transmit a signal to one or more stations (STAs) to prevent the one or more STAs from using a frequency band. The frequency band is shared by the one or more STAs and a radio. The processing device is also configured to detect that the frequency band is available for use by at least one STA of the one or more STAs to transmit uplink signals to the controller without interfering with the radio; and in response, transmit a trigger frame to the at least one STA to schedule the at least one STA to transmit the uplink signals to the controller using the frequency band.

20 Claims, 4 Drawing Sheets

COEXISTENCE OPERATION OF WIRELESS DEVICES

This Application is a Continuation of U.S. patent application Ser. No. 16/445,002, filed on Jun. 18, 2019, now U.S. Pat. No. 11,159,948, which is hereby incorporated by reference in its entirety.

TECHNICAL FIELD

Aspects of the present disclosure generally relate to wireless devices, and more particularly, to coexistence operation of wireless devices using different communication protocols.

BACKGROUND

Multiple wireless devices using different communication protocols may share a common wireless medium. For example, a Bluetooth® radio and a station in a wireless local area network (WLAN) may share a common wireless medium in a 2.4 gigahertz (GHz) frequency band. In this example, there are some solutions to ensure acceptable performance of the Bluetooth® radio and the station sharing the common wireless medium. One solution is clear to send (CTS) to self (CTS2Self). However, CTS2Self may consume medium time for the station and backoff time to send CTS2Self frames, and thus may have a low efficiency of using the wireless medium. Another solution is Target Wake Time (TWT) protocol. However, TWT protocol may not be supported by some stations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The examples, implementations, and embodiments described herein may enable coexistence operation of wireless devices using different communication protocols. For example, a Bluetooth® (BT) radio and a station (STA) in a wireless local area network (WLAN) may share a 2.4 gigahertz (GHz) frequency band. A WLAN device may include a controller and a processing device. The controller may operate in an access point (AP) mode to communicate with the STA. The processing device may transmit a signal to the STA to prevent the STA from using the 2.4 GHz frequency band. Thus, the BT radio may use the 2.4 GHz frequency band to communicate with a BT device without contention with the STA. The processing device may detect that the frequency band is available for use by the STA to transmit uplink signals to the controller without interfering with the BT radio. In response, the processing device may transmit a trigger frame to the STA to schedule the STA to transmit the uplink signals to the controller using the 2.4 GHz frequency band. The STA may then transmit the uplink signals to the controller without backoff. Compared to existing solutions, the present disclosure herein may enable coexistence operation of wireless devices with a more efficient use of the wireless medium.

Figure 1:
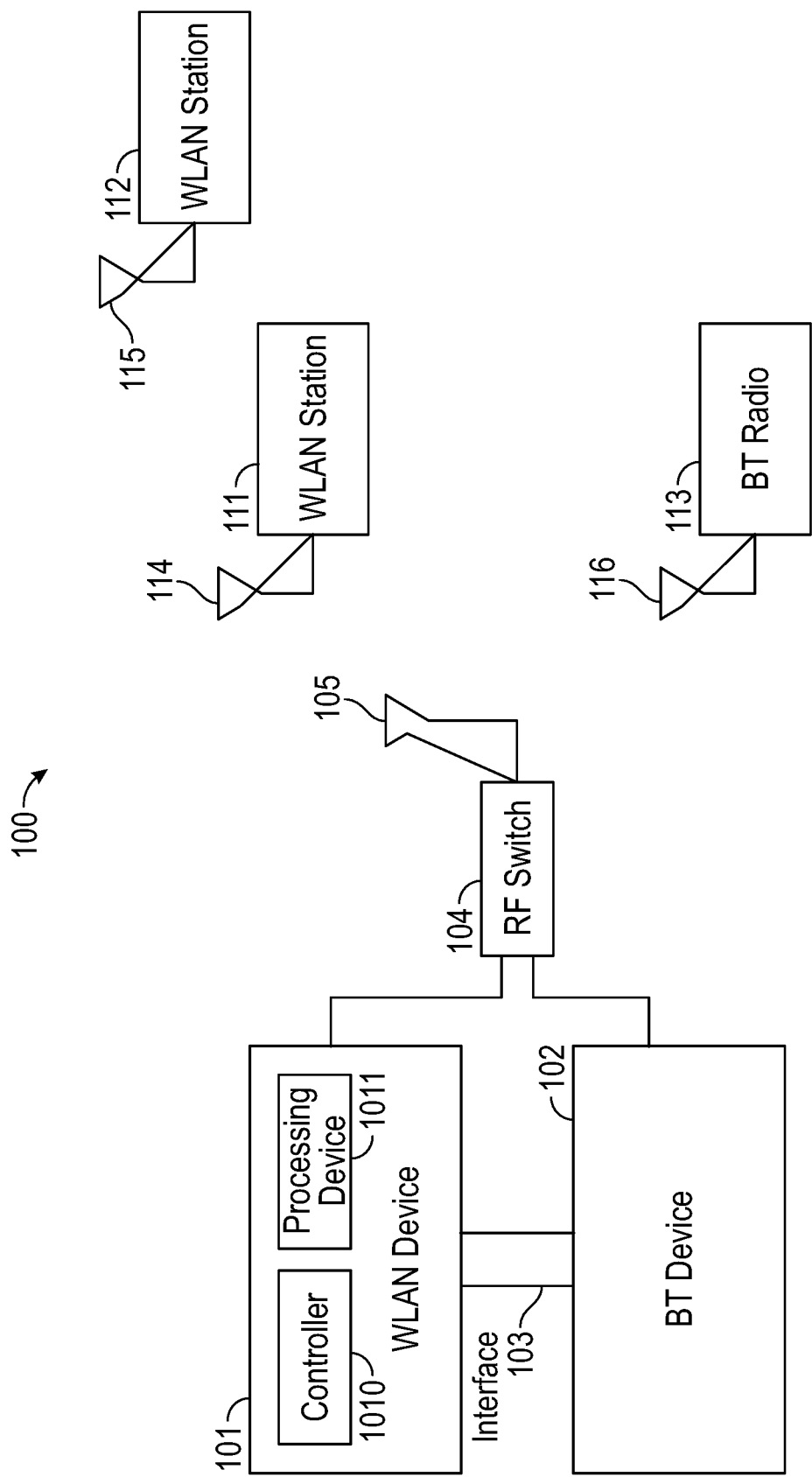
FIG. 1 illustrates an example architecture of a wireless system, in accordance with some embodiments of the present disclosure.

FIG. 1 illustrates an example architecture of a wireless system 100, in accordance with some embodiments of the present disclosure. In one embodiment, as shown in FIG. 1, the wireless system 100 includes a WLAN device 101 and a BT device 102. In one example, the WLAN device 101 and the BT device 102 may be co-located devices. In another example, the WLAN device 101 and the BT device 102 may be combined or located in a single device. The WLAN device 101 and the BT device 102 may communicate with each other via the interface 103.

In one embodiment, the wireless system 100 may also include one or more STAs in a WLAN network such as the STAs 111, 112 and a BT radio 113. The STAs 111, 112 and the BT radio 113 may share a common wireless medium in a 2.4 GHz frequency band. To avoid collision or contention between the STAs 111, 112 and the BT radio 113, in one embodiment, the WLAN device 101 may include a controller 1010 and a processing device 1011 to control the uplink and downlink communications between the WLAN device 101 and the STAs 111, 112, as described in greater details below.

In one embodiment, the WLAN device 101 or the controller 1010 may operate in an AP mode to communicate with the STAs 111 and 112. The processing device 1011 may transmit a signal from the WLAN device 101 in the AP mode to the STAs 111 and 112 to prevent the STAs 111 and 112 from using the 2.4 GHz frequency band. A radio frequency (RF) switch 104 may allow the WLAN device 101 or the controller 1010 to communicate with the STAs 111, 112 using a WiFi protocol. In one example, the RF switch 104 may be co-located with the WLAN device 101 and the BT radio 113. In another example, the RF switch 104 may be combined or located in a single device with the WLAN device 101 and the BT radio 113. The processing device 1011 may transmit the signal via the antenna 105 and the STAs 111 and 112 may receive the signal via the antennas 114 and 115 respectively. In some other embodiments, the controller 1010 may be separated from the WLAN device 101.

In one embodiment, the signal is a beacon signal defined in IEEE 802.11ax standard. The beacon signal may be transmitted periodically such as every 100 milliseconds. To prevent the STAs 111 and 112 from using the 2.4 GHz frequency band, in one embodiment, the processing device 1011 may set one or more multi-user (MU) enhanced distributed channel access (EDCA) parameters in the beacon signal to a value to prevent the STAs 111 and 112 from using the 2.4 GHz frequency band. For example, the processing device 1011 may set the MU EDCA parameters to a high value to indicate that the STAs 111 and 112 need to wait for a sufficient time period before they may access the 2.4 GHz frequency band. In one embodiment, the sufficient time period may be 255 time slots with each time slot having 9 microseconds. The beacon signal may be transmitted to all STAs associated with the WLAN device 101. After receiving the beacon signal, the high value of the MU EDCA parameters may indicate to the STAs 111 and 112 that they need to start to wait and may not access the 2.4 GHz frequency band to communicate with the WLAN device 101. In this way, the STAs 111 and 112 may be effectively prevented from using the 2.4 GHz frequency band.

After the STAs 111 and 112 are prevented from using the 2.4 GHz frequency band, in one embodiment, the BT radio 113 may operate in the 2.4 GHz frequency band to communicate with the BT device 102. Because the 2.4 GHz frequency band is now available or open to the BT radio 113, the BT radio 113 may communicate with the BT device 102 without interfering with the STAs 111 and 112. For example, the RF switch 104 may allow the BT device 102 to communicate with the BT radio 113 using a BT protocol and disallow the WLAN device 101 to communicate with the STAs 111 and 112 using the WiFi protocol. The BT device 102 may communicate with the BT radio 113 via the antenna 105, and the BT radio 113 may communicate with the BT device 102 via the antenna 116.

In one embodiment, the processing device 1011 may detect that the 2.4 GHz frequency band is available for use by at least one STA (e.g., the STA 111) of the STAs 111 and 112 to transmit uplink signals to the WLAN device 101 or the controller 1010 without interfering with the BT radio 113. In this embodiment, the processing device 1011 may detect that the BT radio 113 is not using the 2.4 GHz frequency band for a time period. For example, the BT device 102 may transmit information to the WLAN device 101 or the processing device 1011 via the interface 103 to notify the processing device 1011 that the BT radio 113 is not or will not using the 2.4 GHz frequency band for a time period.

After detecting that the 2.4 GHz frequency band is available for use by the STA 111, in one embodiment, the processing device 1011 may transmit a trigger frame from the WLAN device 101 to the STA 111 to schedule the STA 111 to transmit the uplink signals to the WLAN device 101 or the controller 1010 using the 2.4 GHz frequency band. For example, after detecting that the BT radio 113 is not using the 2.4 GHz frequency band for a time period, the processing device 1011 may transmit the trigger frame to schedule the STA 111 to transmit the uplink signals using the 2.4 GHz frequency band during the time period. In one embodiment, the trigger frame is defined in IEEE 802.11ax standard. After receiving the trigger frame, the STA 111 may transmit the uplink signals using the 2.4 GHz frequency band to the WLAN device 101 during the time period without contention with the BT radio 113. For example, the RF switch 104 may allow the WLAN device 101 to receive the uplink signals from the STA 111.

In one embodiment, the processing device 1011 may transmit the trigger frame to schedule the STA 111 to transmit the uplink signals to the WLAN device 101 using the 2.4 GHz frequency band without backoff. In this embodiment, when the STA 111 receives the trigger frame, other STAs associated with the WLAN device 101 (e.g., the STA 112) are still prevented from using the 2.4 GHz frequency band. Thus, when the STA 111 transmits the uplink signals using the 2.4 GHz frequency band to the WLAN device 101, there is no contention from other STAs and backoff is not needed. Therefore, the STA 111 may transmit the uplink signals to the WLAN device 101 using the 2.4 GHz frequency band without backoff. In this way, higher efficiency of using the wireless medium in the 2.4 GHz frequency band may be achieved.

In one embodiment, the processing device 1011 may detect that the 2.4 GHz frequency band is available for use by the WLAN device 101 to transmit downlink signals to the STAs 111 and 112 without interfering with the BT radio 113. In response, the processing device 1011 may schedule the WLAN device 101 to transmit the downlink signals to the STAs 111 and 112 using the 2.4 GHz frequency band. For example, the BT device 102 may transmit information to the WLAN device 101 or the processing device 1011 via the interface 103 to notify the processing device 1011 that the BT radio 113 is not or will not using the 2.4 GHz frequency band for a time period. Thus the WLAN device 101 may transmit the downlink signals to the STAs 111 and 112 using the 2.4 GHz frequency band during the time period. For example, the RF switch 104 may allow the WLAN device 101 or the controller 1010 to transmit the downlink signals to the STAs 111 and 112.

Examples, implementations, and embodiments described with reference to FIG. 1 are not intended to be limiting. In other embodiments, the wireless system 100 may include a different number of STAs. In other embodiments, the wireless system 100 may include one or more wireless devices using communication protocols other than Bluetooth® protocol and sharing the wireless medium with the STAs. For example, the wireless devices may use Long-Term Evolution (LTE) or Zigbee protocols. In other embodiments, the frequency band may be a different frequency band such as the 5 GHz frequency band.

Figure 2:
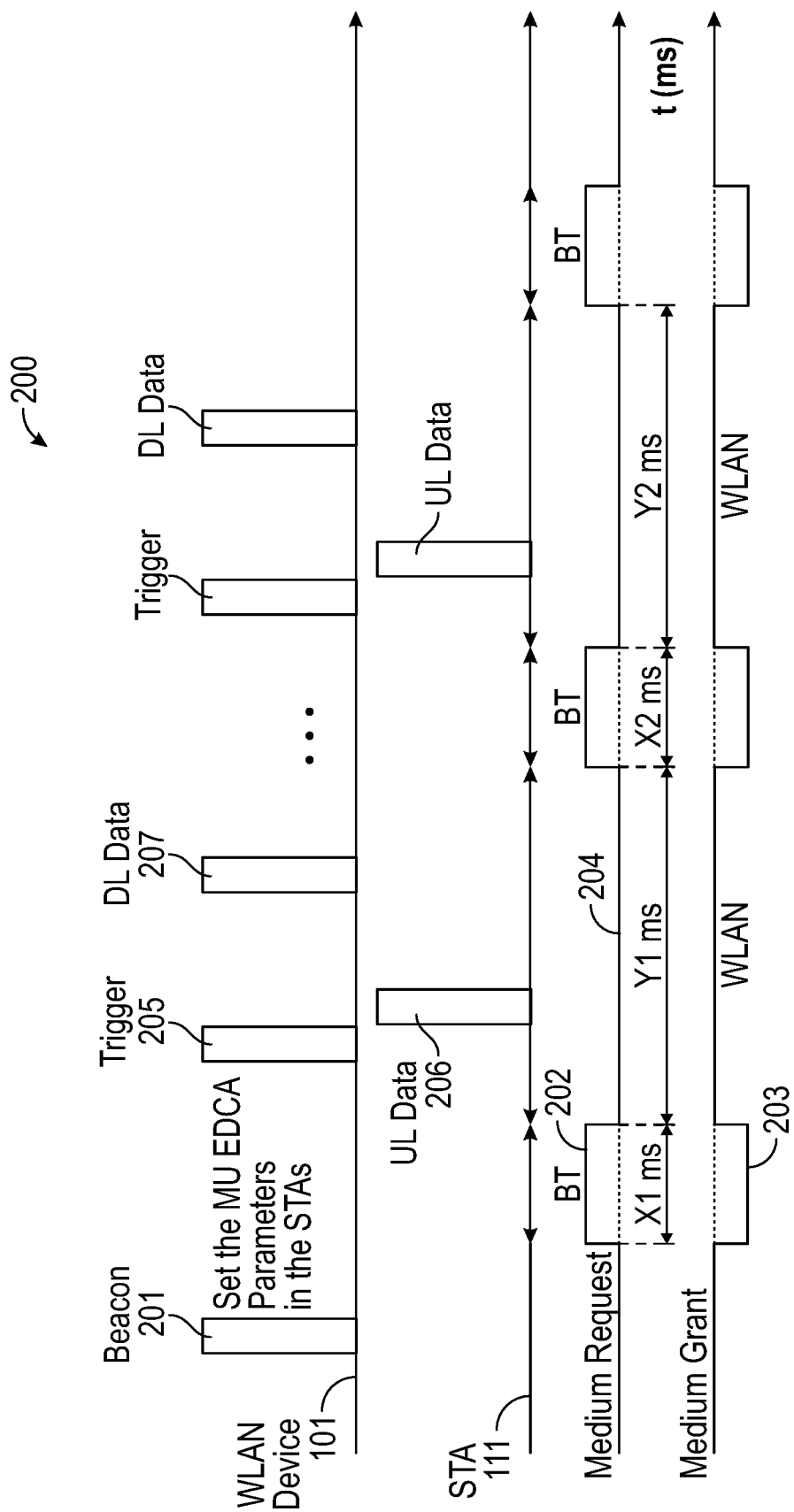
FIG. 2 illustrates an example diagram of coexistence operation of wireless devices, in accordance with some embodiments of the present disclosure.

FIG. 2 illustrates an example diagram of coexistence operation of wireless devices, in accordance with some embodiments of the present disclosure. As shown, in one embodiment, the WLAN device 101 or more specifically the processing device 1011 may transmit a beacon signal to all associated STAs such as the STAs 111 and 112 to prevent all the associated STAs from using the 2.4 GHz frequency band, as indicated by arrow 201. The processing device 1011 may set the MU EDCA parameters for the STAs to have a high value to prevent the STAs from using the 2.4 GHz frequency band. In this way, the STAs 111 and 112 may be effectively prevented from using the 2.4 GHz frequency band.

In one embodiment, the BT radio 113 may request to use the 2.4 GHz frequency band to communicate with the BT device 102 for a time period, as indicated by arrow 202. Because all the STAs associated with the WLAN device 101 have been prevented from using the 2.4 GHz frequency band as described above, there is no contention between the STAs and the BT radio 113. Thus, the processing device 1011 may grant the BT radio 113 to use the 2.4 GHz frequency band to communicate with the BT device 102 for the requested time period (X1 milliseconds), as indicated by arrow 203.

In one embodiment, the processing device 1011 may detect that the BT radio 113 is not or will not use the 2.4 GHz frequency band for a time period (Y1 milliseconds), as indicated by arrow 204. Thus, this time period is available for WLAN uplink or downlink communications between the STAs and the WLAN device 101 without interfering with the BT radio 113. In one embodiment, the processing device 1011 may transmit a trigger frame to at least one STA such as the STA 111 to schedule the STA 111 to transmit uplink signals to the wireless device 101 using the 2.4 GHz frequency band, as indicated by arrow 205. After the STA 111 receives the trigger frame, the STA 111 may transmit the uplink signals to the WLAN device 101 using the 2.4 GHz frequency band without backoff, as indicated by arrow 206. After the STA 111 transmits the uplink signals to the WLAN device 101, the STA 111 may restart to wait the time period indicated by the value of the corresponding MU EDCA parameter. For example, after the STA 111 transmits the uplink signals to the WLAN device 101, the STA 111 may restart to wait for 255 time slots.

In one embodiment, during the time period (Y1 milliseconds), the processing device 1011 may also schedule the WLAN device 101 to transmit downlink signals to the STAs 111 and 112 using the 2.4 GHz frequency band. And the WLAN device 101 may transmit the downlink signals to the STAs 111 and 112 using the 2.4 GHz frequency band without interfering with the BT radio 113, as indicate by arrow 207.

In one embodiment, the processing device 1011 may perform a short backoff (e.g., 1-2 time slots) before it transmits the beacon signal or the downlink signals to avoid any potential contention with the WLAN device 101.

Figure 3:
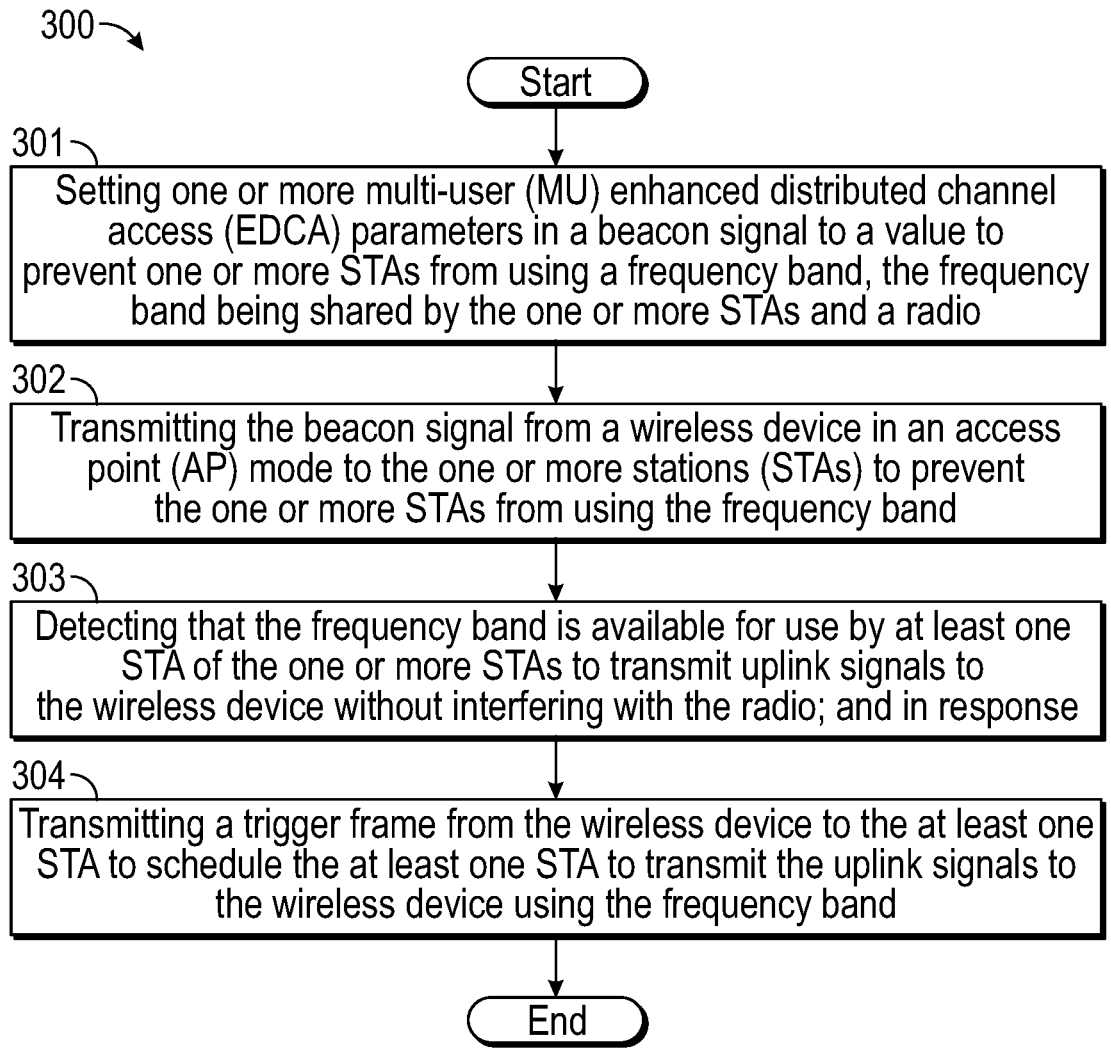
FIG. 3 illustrates a flow diagram of a method of coexistence operation of wireless devices, in accordance with one embodiment of the present disclosure.

FIG. 3 illustrates a flow diagram of a method 300 of coexistence operation of wireless device, in accordance with one embodiment of the present disclosure. In some embodiments, the method 300 may be performed by the WLAN device 101. The method 300 begins at block 301, where the method 300 comprises setting one or more MU EDCA parameters in a beacon signal to a value to prevent one or more STAs (e.g., the STAs 111 and/or 112) from using a frequency band, the frequency band being shared by the one or more STAs and a radio (e.g., the BT radio 113). At block 302, the method 300 comprises transmitting the signal from a wireless device (e.g., the WLAN device 101) in an AP mode to the one or more STAs to prevent the one or more STAs from using a frequency band.

At block 303, the method 300 comprises detecting that the frequency band is available for use by at least one STA of the one or more STAs to transmit uplink signals to the wireless device without interfering with the radio. And in response, at block 304, the method 300 comprises transmitting a trigger frame from the wireless device to the at least one STA to schedule the at least one STA to transmit the uplink signals to the wireless device using the frequency band.

Figure 4:
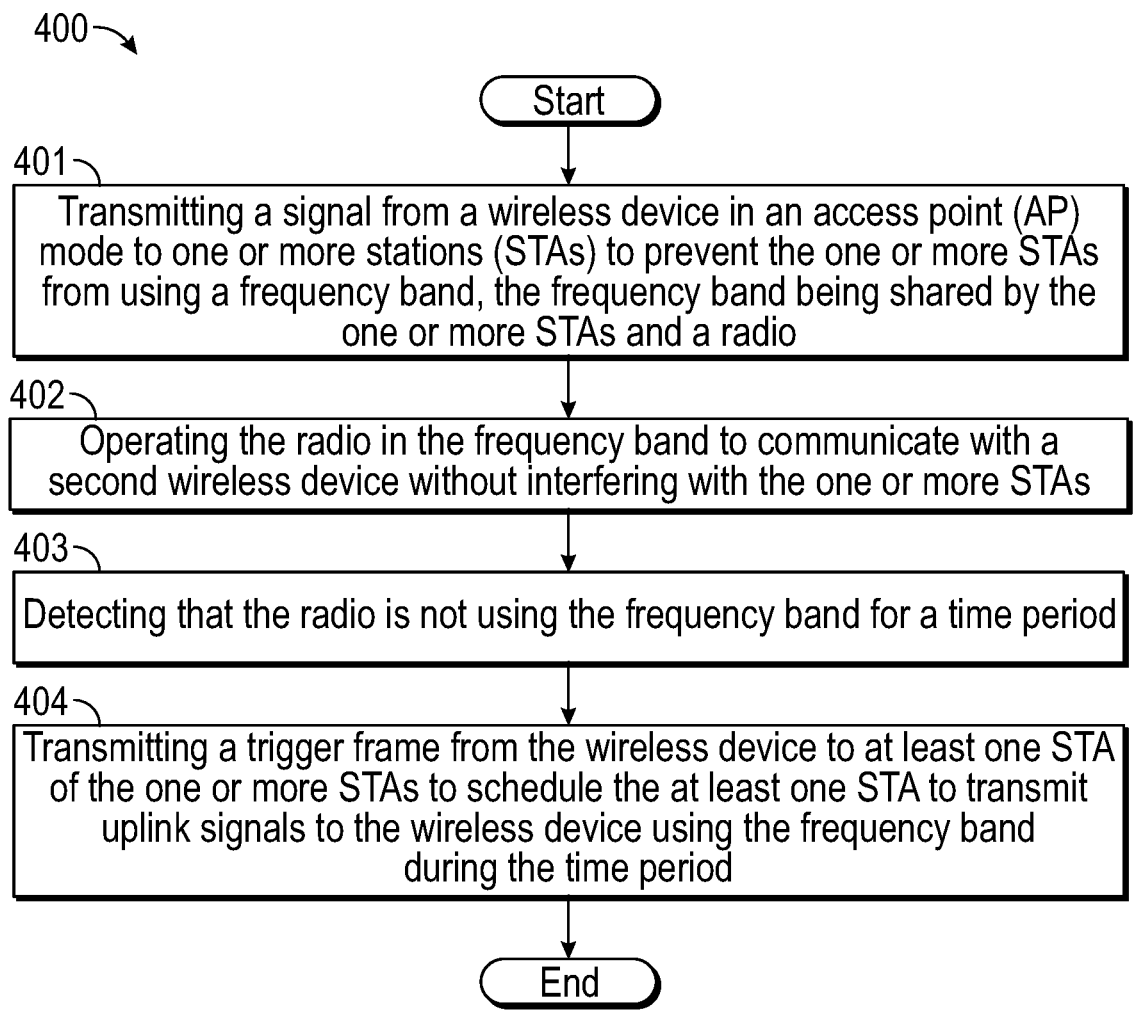
FIG. 4 illustrates a flow diagram of a method of coexistence operation of wireless devices, in accordance with another embodiment of the present disclosure.

FIG. 4 illustrates a flow diagram of a method 400 of coexistence operation of wireless device, in accordance with another embodiment of the present disclosure. The method 400 begins at block 401, where the method 400 comprises transmitting a signal from a wireless device (e.g., the WLAN device 101) in an AP mode to one or more STAs (e.g., the STAs 111 and/or 112) to prevent the one or more STAs from using a frequency band, the frequency band being shared by the one or more STAs and a radio (e.g., the BT radio 113).

At block 402, the method 400 comprises operating the radio in the frequency band to communicate with a second wireless device (e.g., the BT device 102) without interfering with the one or more STAs. At block 403, the method 400 comprises detecting that the radio is not using the frequency band for a time period. At block 443, the method 400 comprises transmitting a trigger frame from the wireless device to at least one STA of the one or more STAs to schedule the at least one STA to transmit uplink signals to the wireless device using the frequency band during the time period.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, by a processing device of a first wireless device, a request from a second wireless device to access a frequency band for a first amount of time;
    preventing, by the processing device, a plurality of stations (STAs) associated with the first wireless device from using the frequency band for a second amount of time that is greater than the first amount of time;
    granting, by the processing device, access to the frequency band to the second wireless device at a first time and for the first amount of time;
    receiving, by the processing device via an interface between the first wireless device and a third wireless device, a notification that the frequency band is available for use by the first wireless device to communicate with the plurality of STAs without interfering with the second wireless device at a second time after the first amount of time and for a third amount of time, wherein the third wireless device is co-located with the first wireless device and the third wireless device is associated with the second wireless device, wherein a sum of the first amount of time and the third amount of time is less than the second amount of time;
    transmitting, by the first wireless device, a trigger frame to a first STA of the plurality of STAs to schedule the first STA to transmit uplink data to the first wireless device using the frequency band at a third time and during the third amount of time without backoff, wherein the third time is after the second time; and
    receiving, by the first wireless device, the uplink data from the first STA using the frequency band at the third time and during the third amount of time.

2. The method of claim 1, further comprising:
    scheduling, by the processing device, the first wireless device to transmit downlink data to a second STA of the plurality of STAs at a fourth time and during the third amount of time, wherein the fourth time is after the second time; and
    transmitting, by the first wireless device, the downlink data to the second STA at the fourth time and during the third amount of time.

3. The method of claim 2, wherein the first STA and the second STA are the same STA.

4. The method of claim 1, further comprising:
    transmitting, by the first wireless device, a second trigger frame to a second STA of the plurality of STAs to schedule the second STA to transmit second uplink data to the first wireless device using the frequency band at a fourth time and during the third amount of time without backoff, wherein the fourth time is after the second time; and
    receiving, by the first wireless device, the second uplink data from the second STA using the frequency band at the fourth time and during the third amount of time.

5. The method of claim 1, wherein preventing the plurality of STAs from using the frequency band for the second amount of time comprises:
    setting one or more multi-user (MU) enhanced distributed channel access (EDCA) parameters in a beacon signal to a value corresponding to the second amount of time to prevent the plurality of STAs from using the frequency band, the frequency band being shared by the plurality of STAs and the second wireless device; and
    transmitting, by the first wireless device, the beacon signal to the plurality of STAs to prevent the plurality of STAs from using the frequency band for the second amount of time.

6. The method of claim 5, wherein the beacon signal is defined in IEEE 802.11ax standard.

7. The method of claim 1, wherein the frequency band includes a 2.4 gigahertz (GHz) frequency band.

8. The method of claim 1, wherein the first wireless device is a wireless local area network (WLAN) device, the second wireless device is a first wireless personal area network (WPAN) device, and the third wireless device is a second WPAN device.

9. The method of claim 1, wherein the trigger frame is defined in IEEE 802.11ax standard.

10. An electronic device comprising:
    a first wireless device;
    a second wireless device co-located with the first wireless device; and an interface coupled between the first wireless device and the second wireless device, wherein the first wireless device is configured to:
  receive a request from a third wireless device to access a frequency band for a first amount of time;
  prevent a plurality of stations (STAs) associated with the first wireless device from using the frequency band for a second amount of time that is greater than the first amount of time;
  grant access to the frequency band to the third wireless device at a first time and for the first amount of time;
  receive, via the interface, a notification that the frequency band is available for use by the first wireless device to communicate with the plurality of STAs without interfering with the third wireless device at a second time after the first amount of time and for a third amount of time, wherein a sum of the first amount of time and the third amount of time is less than the second amount of time;
  transmit a trigger frame to a first STA of the plurality of STAs to schedule the first STA to transmit uplink data to the first wireless device using the frequency band at a third time and during the third amount of time without backoff, wherein the third time is after the second time; and
  receive the uplink data from the first STA using the frequency band at the third time and during the third amount of time.

11. The electronic device of claim 10, further comprising:
an antenna; and
a radio frequency (RF) switch coupled to the first wireless device, the second wireless device, and the antenna.

12. The electronic device of claim 10, wherein the first wireless device is a wireless local area network (WLAN) device comprising:
  a controller configured to operate in an access point (AP) mode to receive the request from the third wireless device, prevent the plurality of STAs from using the frequency band, grant access to the frequency band to the third wireless device, transmit the trigger frame, and receive the uplink data; and
  a processing device configured to receive, via the interface, the notification from the second wireless device.

13. The electronic device of claim 10, wherein the second wireless device is a wireless personal area network (WPAN) device.

14. The electronic device of claim 10, wherein the first wireless device is further configured to:
  schedule the first wireless device to transmit downlink data to a second STA of the plurality of STAs at a fourth time and during the third amount of time, wherein the fourth time is after the second time; and
  transmit the downlink data to the second STA at the fourth time and during the third amount of time.

15. The electronic device of claim 14, wherein the first STA and the second STA are the same STA.

16. The electronic device of claim 10, wherein the first wireless device is further configured to:
  transmit a second trigger frame to a second STA of the plurality of STAs to schedule the second STA to transmit second uplink data to the first wireless device using the frequency band at a fourth time and during the third amount of time without backoff, wherein the fourth time is after the second time; and
  receive the second uplink data from the second STA using the frequency band at the fourth time and during the third amount of time.

17. The electronic device of claim 10, wherein, to prevent the plurality of STAs from using the frequency band for the second amount of time, the first wireless device is further configured to:
  set one or more multi-user (MU) enhanced distributed channel access (EDCA) parameters in a beacon signal to a value corresponding to the second amount of time to prevent the plurality of STAs from using the frequency band, the frequency band being shared by the plurality of STAs and the third wireless device; and
  transmit the beacon signal to the plurality of STAs to prevent the plurality of STAs from using the frequency band for the second amount of time,
  wherein the beacon signal and the trigger frame are defined in IEEE 802.11ax standard, and
  wherein the frequency band includes a 2.4 gigahertz (GHz) frequency band.

18. A method comprising:
  transmitting a signal from a first wireless device in an access point (AP) mode to a plurality of stations (STAs) to prevent the plurality of STAs from using a frequency band for a first amount of time, the frequency band being shared by the plurality of STAs and a second wireless device;
  receiving a request from the second wireless device to access the frequency band for a second amount of time less than the first amount of time;
  granting access to the frequency band to the second wireless device at a first time and for the second amount of time in response to determining that the plurality of STAs are prevented from using the frequency band;
  operating the second wireless device in the frequency band to communicate with a third wireless device without interfering with the plurality of STAs at the first time and for the second amount of time, wherein the third wireless device is co-located with the first wireless device;
  determining that the second wireless device is not using the frequency band at a second time after the second amount of time and for a third amount of time, wherein a sum of the second amount of time and the third amount of time is less than the first amount of time;
  transmitting a trigger frame from the first wireless device to the plurality of STAs to schedule to a first STA of the plurality of STAs to schedule the first STA to transmit uplink signals to the first wireless device using the frequency band at a third time and during the third amount of time without backoff, wherein the third time is after the second time; and
  receiving the uplink signals from the first STA using the frequency band at the third time and during the third amount of time.

19. The method of claim 18, wherein determining that the second wireless device is not using the frequency band at the second time comprises receiving from the third wireless device a notification that the frequency band is available for use by the first wireless device.

20. The method of claim 18, further comprising:
  scheduling the first wireless device to transmit downlink signals to a second STA of the plurality of STAs at a fourth time and during the third amount of time, wherein the fourth time is after the second time; and
  transmitting the downlink signals to the second STA at the fourth time and during the third amount of time.

* * * * *